Aug. 8, 1967   S. J. WENTHE ET AL   3,334,542
LIGHT DIFFUSER
Filed Oct. 16, 1964
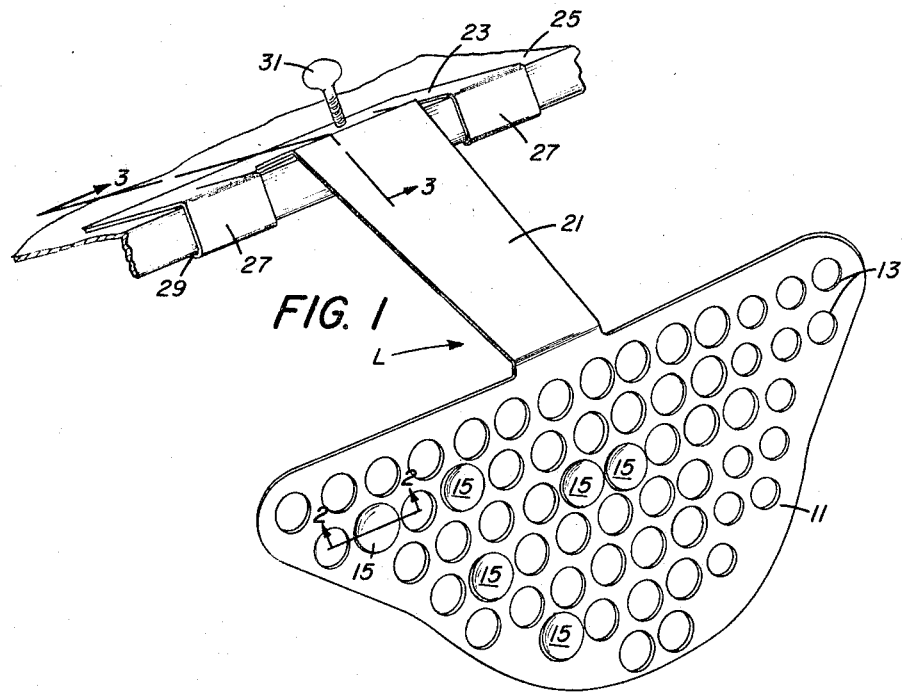
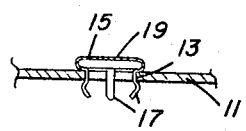
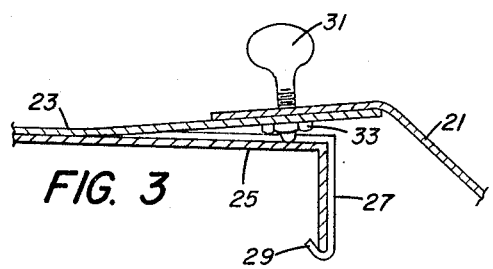
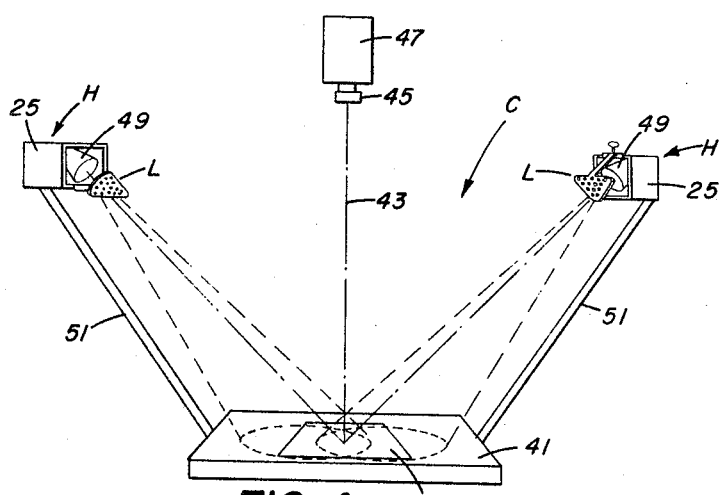
STEPHEN J. WENTHE
ANDREW T. LEMMENS
INVENTORS
BY R. Frank Smith
Paul W. Holmes
ATTORNEYS

United States Patent Office 3,334,542
Patented Aug. 8, 1967

3,334,542
LIGHT DIFFUSER
Stephen J. Wenthe and Andrew T. Lemmens, Rochester, N.Y., assignors to Eastman Kodak Company, Rochester, N.Y., a corporation of New Jersey
Filed Oct. 16, 1964, Ser. No. 404,290
3 Claims. (Cl. 88—24)

This invention relates to a device for controlling illumination and, more particularly, to a light diffuser for selectively controlling the illumination of an object or area from a source of illumination directed thereto.

The use of light diffusers, i.e. light shields, for the purpose of reducing excessive illumination, including undesirable light reflection, is well known in the art. Indeed there have been a number of different devices which have been devised for carrying out this function. Many of the prior art devices embody relatively complex structures and are quite expensive to manufacture. These, as well as many other simpler devices, do not provide the flexibility in control which is necessary or at least desirable when one wishes to illuminate a document for photographic purposes. While the light diffuser of the present invention was originally designed for use in controlling the illumination of a document for photographic purposes, the diffuser can be utilized with equal facility and advantage in any situation where it is desired to selectively control the intensity and uniformity of illumination of an object or area from an artificial source. Accordingly, while the diffuser will be described herein with reference to photographic apparatus, such description is for illustrative purposes only. In one of its broader aspects, the light diffuser of the present invention comprises a perforated light screen which is positionable between a source of illumination and the object or area to which light is directed, and means for individually closing selected perforations in the screen to the passage of light therethrough.

One object of the present invention is, therefore, to provide an improved device for reducing excessive illumination on an object or area.

Another object of the present invention is to provide a light diffuser with which one is able to selectively control the illumination from an artificial source of an illuminated object.

Another object of the present invention is to provide a light diffuser for use in combination with a document copying apparatus to obtain uniform illumination of a document for photographic purposes.

Yet another object of the present invention is to provide a light diffuser for use in photographic copying to selectively reduce the intensity of illumination on predetermined areas of a document to be photographed.

Another object of the present invention is to provide a light diffuser for use in combination with photographic copying apparatus for eliminating undesired light reflections and for reducing excessive light intensity in selected areas of a document to be copied.

Still other objects and advantages of the present invention will become readily apparent to those skilled in the art from the following description with reference to the drawings in which like characters denote like parts and wherein:

FIGURE 1 is a perspective view of a light diffuser embodying the present invention.

FIGURE 2 is an enlarged sectional view taken along the lines 2—2 of FIGURE 1.

FIGURE 3 is an enlarged sectional view taken along the lines 3—3 of FIGURE 1.

FIGURE 4 is a schematic view illustrating the mounting of the light diffuser in a document copying apparatus in accordance with the present invention.

The light diffuser L of the present invention comprises a plate 11 having a plurality of perforations 13 of approximately the same diameter randomly distributed in the plate. The size of the perforations and the size and shape of the plate will depend upon the requirements of the intended application, consideration being given, for example, to the size and configuration of the light source and the distance between the source and the object or area to be illuminated. The numeral 15 designates one of a plurality of plugs or buttons which may be selectively inserted in the perforations 13. The plugs as well as the plate 11 are preferably formed of a light impervious material to prevent the passage of light through the light diffuser except where unclosed perforations exist.

Of course, the plate and/or plugs could in accordance with the present invention be formed of translucent or even transparent material to better meet the requirements of any specific application, one important aspect of the invention being the control flexibility obtained with the selective insertion of plugs in the plate perforations.

As best illustrated in FIGURE 2, the plugs, according to a preferred embodiment of the invention, are formed with a plurality of flexible fingers 17 which depend from the light impervious front surface 19 of the plug. The ends of diametrically opposed fingers 17 are spaced a distance slightly greater than the diameter of the perforations, whereas the spacing inward of such ends is less than such diameter whereby the fingers can be snapped into a perforation and will hold the plugs in the plate.

One form of mounting means for the plate 11 is illustrated in the drawings. The mounting means comprises a leg 21 which depends from plate 11 and is attached to a mounting bracket 23 by one or more spot welds, a threaded or other fastening means. The numeral 25 designates the wall of an incandescent lamp housing H. The flange 27 is formed at substantially a right angle to the adjacent surface of the bracket. The edge of the flange is bent over to form a hook 29 for engaging the wall 25 of the lamp housing. A thumb screw 31 is threaded through a nut 33, which is affixed to the undersurface of bracket 23 so that, when the thumb screw is advanced, the end of the screw engages the housing and securely engages the hook 29 on the edge of the housing. This structural relationship is perhaps best illustrated in FIGURE 3.

FIGURE 4, which is somewhat schematic in form, illustrates how the light diffuser of the present invention is used in combination with a document copying apparatus for controlling the intensity and uniformity of illumination of a document for photographing. As is well known, a document D is placed on platen 41 of the copying apparatus C in such a way that it is centrally located relative to the optical axis 43 of the lens 45 in the film unit 47. The artificial light sources 49 are mounted in the lamp housings H, which are supported above and on opposite sides of the platen 41 by means of fixed supports 51. The light diffusers L are mounted on the wall 25 of lamp housings H in the manner described above so that light from the sources 49 passes through the perforated plates 11 on its way toward illuminating the document D. The light diffusers L can be mounted either from the top or the bottom of the lamp housings H or in any other convenient fashion relative to the light sources.

One of the important features of the invention will be readily apparent upon considering the arrangement of FIGURE 4. Without the light diffuser of the present invention, it is possible that the center of the document would be overly illuminated, that is, a "hot spot" would occur, but with the present invention it is possible to reduce the illumination at the center of the document by inserting plugs in appropriate perforations in the plates 11 of the diffusers L. Thus all of the document surface, including the corners and the center of the document, are evenly illuminated. The uniformity or desired illumination can be obtained by making test photographic exposures of the document and adjusting the positions of or adding plugs 15 where required in the plates 11 of the diffusers L. Once the proper adjustment has been made in the diffusers L, uniformity of subsequent copying will be assured.

It will now be appreciated by those skilled in the art that the light diffuser of the present invention is a very simple device and enables one to control the illumination on an object or of an area by individually closing selected perforations in the device to prevent the passage of light therethrough.

The invention has been described in detail with particular reference to preferred embodiments thereof, but it will be understood that variations and modifications can be effected within the spirit and scope of the invention as described hereinabove and as defined in the appended claims.

Having now particularly described our invention, what we desire to secure by Letters Patent of the United States and what we claim is:

1. In a copying apparatus having at least one source of artificial light for illuminating the object to be copied, a device for diffusing and selectively controlling the intensity of light passing from said source to said object, comprising a plate having a plurality of perforations; means for mounting said plate between said source and said object to be copied; and means selectively closing certain of said perforations whereby the light passing to said object is uniformly diffused and the intensity of light passing to different portions of said object is selectively controlled.

2. A device as defined in claim 1 wherein the means for selectively closing any of said perforations in said plate comprises a plurality of light impervious plugs each having means for releasably mounting the same in any one of said perforations.

3. In combination with a copying apparatus having a plurality of sources of artificial light for illuminating the surface of an object to be copied, the beams of said sources being disposed so that portions thereof overlap on said object surface, a plurality of diffusing and control assemblies each respectively disposed within the beam between one of said sources and said object, each of said diffusing and control assemblies comprising:
  (a) a plate having a plurality of perforations, and
  (b) a plurality of releasably mounted plugs mounted in and selectively closing certain of said perforations to the passing of light therethrough;
whereby said diffusing and control assemblies disposed between said sources and said object provide a uniform intensity illumination over said object by diffusing the light passing to said object and controlling the intensity of said portions of said beams which overlap on said object surface.

References Cited

UNITED STATES PATENTS 2,971,447 2/1961 Debrie.
3,076,890 2/1963 Guth _____ 240—78 X NORTON ANSHER, *Primary Examiner.*

R. A. WINTERCORN, *Examiner.*